United States Patent
Uhling et al.

(10) Patent No.: US 10,911,929 B2
(45) Date of Patent: Feb. 2, 2021

(54) POWER-EFFICIENT DISCOVERY PROCESS FOR NODES WITHIN A WIRELESS MESH NETWORK

(71) Applicant: Itron, Inc., Liberty Lake, WA (US)

(72) Inventors: Thomas Uhling, Spokane Valley, WA (US); Imad Jamil, Meudon (FR); Fabrice Monier, Bry sur Marne (FR); Keith Wayne Barnes, Waseca, MN (US)

(73) Assignee: ITRON, INC., Liberty Lake, WA (US)

( * ) Notice: Subject to any disclaimer, the term of this patent is extended or adjusted under 35 U.S.C. 154(b) by 68 days.

(21) Appl. No.: 16/035,533

(22) Filed: Jul. 13, 2018

(65) Prior Publication Data

US 2020/0021968 A1  Jan. 16, 2020

(51) Int. Cl.
  *H04W 8/00* (2009.01)
  *H04W 4/80* (2018.01)
  *H04W 52/02* (2009.01)
  *H04W 72/04* (2009.01)
  *H04W 84/18* (2009.01)
  *H04W 84/12* (2009.01)

(52) U.S. Cl.
  CPC ............. *H04W 8/005* (2013.01); *H04W 4/80* (2018.02); *H04W 52/0248* (2013.01); *H04W 72/0446* (2013.01); *H04W 84/12* (2013.01); *H04W 84/18* (2013.01)

(58) Field of Classification Search
  CPC combination set(s) only.
  See application file for complete search history.

(56) References Cited

U.S. PATENT DOCUMENTS

| | | | |
|---|---|---|---|
| 7,986,718 B2 | 7/2011 | Monier | |
| 8,442,092 B2 | 5/2013 | San Filippo, III et al. | |
| 2005/0198370 A1* | 9/2005 | Miller | H04L 63/0428 709/238 |

(Continued)

FOREIGN PATENT DOCUMENTS

AU  2009202590 A1  7/2009

OTHER PUBLICATIONS

Non-Final Office Action received for U.S. Appl. No. 16/035,535, dated Oct. 29, 2019, 20 pages.

(Continued)

*Primary Examiner* — Syed Ali
(74) *Attorney, Agent, or Firm* — Artegis Law Group, LLP

(57) ABSTRACT

A wireless network includes a plurality of nodes configured to implement an improved discovery process to efficiently and reliably pair with one another with low power consumption. A given node divides time into slots and then performs discovery operations during designated discovery windows. The discovery windows occur periodically but at different times of day. During a given discovery window, nodes attempt discovery using a reduced set of channels that varies from one window to the next, thereby increasing the likelihood that nodes operate on the same channel. Nodes also implement a pairing protocol to coordinate pairing, potentially avoiding situations where all nodes attempt to pair simultaneously. The discovery process may be completed expeditiously, thereby conserving power and extending the operational lifetime of nodes which rely on battery power.

21 Claims, 9 Drawing Sheets

(56) References Cited

U.S. PATENT DOCUMENTS

| | | | |
|---|---|---|---|
| 2006/0215581 A1* | 9/2006 | Castagnoli | H04W 56/0015 370/254 |
| 2006/0215583 A1* | 9/2006 | Castagnoli | H04L 45/60 370/254 |
| 2010/0091760 A1* | 4/2010 | Yoon | H04J 3/0658 370/350 |
| 2010/0142421 A1* | 6/2010 | Schlicht | H04W 4/23 370/310 |
| 2014/0092752 A1* | 4/2014 | Hui | H04B 1/713 370/242 |
| 2015/0049644 A1* | 2/2015 | Lee | H04W 84/20 370/256 |
| 2015/0131989 A1* | 5/2015 | Syed | H04Q 11/0066 398/45 |
| 2016/0021613 A1* | 1/2016 | Mani | H04W 56/001 370/311 |
| 2016/0164726 A1* | 6/2016 | Fraser | H04W 48/00 370/254 |
| 2017/0347340 A1* | 11/2017 | Haley | H04W 72/042 |
| 2017/0347359 A1* | 11/2017 | Yang | H04W 52/24 |
| 2018/0054782 A1* | 2/2018 | Qi | H04W 52/0248 |
| 2019/0007902 A1* | 1/2019 | Khaled | H04W 52/0216 |
| 2019/0104398 A1 | 4/2019 | Owen et al. | |
| 2019/0141620 A1 | 5/2019 | Pujari et al. | |
| 2019/0349079 A1* | 11/2019 | Novlan | H04B 7/15542 |
| 2020/0170010 A1* | 5/2020 | Luo | H04L 5/26 |

OTHER PUBLICATIONS

International Search Report for application No. PCT/US2019/041005 dated Oct. 8, 2019.

Karowski et al., "Cooperation in Neighbor Discovery", 2017 Wireless Days Conference, Retrieved from the internet: <URL:https://ieeexplore.ieee.org/document/7918123>, May 4, 2017, 6 pages.

International Search Report for application No. PCT/US2019/040914 dated Oct. 17, 2019.

Dutta et al.,"Practical Asynchronous Neighbor Discovery and Rendezvous for Mobile Sensing Applications", SenSys 08, Retrieved from the Internet: <URL: http://citeseerx.ist.psu.edu/viewdocIdownload?doi=10.1.1.155.5592&rep=rep1&type=pdf>; ACM 978-1-59593-990-6/08/11; Nov. 5-7, 2008, pp. 71-83.

Klyne et al. "Date and Time on the Internet: Timestamps", RFC 3339, https://www.hjp.at/doc/rfclrfc3339.html> Jul. 2002, Retrieved from the Internet: <URL:https://www.hjp.at/doc/rfclrfc3339.html>; 18 pages.

Federal Communications Commission "Code of Federal Regulations (CFR) 47 § 15.247(f)", Standards Manual, Retrieved from the Internet: <URL:https://www.govinfo.gov/content/pkg/CFR-2010-title47-vol4/pdf/CFR-2010-title47-vol4-sec73-623.pdf>;paragraph f, Oct. 1, 2010, 5 pages.

Final Office Action received for U.S. Appl. No. 16/035,535, dated May 14, 2020, 26 pages.

\* cited by examiner

POWER-EFFICIENT DISCOVERY PROCESS FOR NODES WITHIN A WIRELESS MESH NETWORK

BACKGROUND

Field of the Various Embodiments

Embodiments of the present invention relate generally to wireless network communications and, more specifically, to a power-efficient discovery process for nodes within a wireless network.

Description of the Related Art

A conventional wireless mesh network includes a plurality of nodes configured to communicate with one another. In certain types of heterogeneous wireless mesh networks, different types of nodes communicate and interact with one another within the network, including mains powered device (MPD) nodes and battery-powered device (BPD) nodes. MPD nodes typically are coupled to a power grid and have continuous access to power (except during power outages), which allows MPD nodes to receive and transmit data more or less continuously. On the other hand, BPD nodes are powered by batteries and therefore have only a finite supply of power. To manage the finite supply of power, BPD nodes normally remain in a powered-down state and power on only at intermittent intervals.

During operation, both MPD nodes and BPD nodes communicate using a technique known as "channel hopping." With channel hopping, a given node periodically transitions between different channels. The particular sequence of channels across which a given node transitions is referred to as a "channel hopping sequence." A given node normally receives transmissions only on the current channel in a particular channel hopping sequence; therefore, other nodes typically transmit data to the given node based on the particular channel hopping sequence.

During initialization, MPD nodes and BPD nodes perform a discovery process to determine the channel hopping sequences of nearby nodes within the mesh network and establish communication links (or "pair") with some or all of those nodes. In performing this process, a given node usually transmits a discovery beacon request (DBR) to one or more nodes, and, upon receiving the DBR, a receiving node transits a discovery beacon (DB) back to the given node. The DB includes information that permits the two nodes to pair.

Because MPD nodes can operate continuously, pairing with MPD nodes is considerably easier than pairing with BPD nodes, which are powered down far more often than not. Accordingly, when a given BPD node is operational, the BPD node preferentially pairs with a nearby MPD node in order to quickly gain access to the mesh network. Among other things, quickly completing the discovery process conserves battery life because the discovery process can consume quite a bit of power. In many operating scenarios, though, a BPD node cannot quickly locate a nearby MPD node during the discovery process. For example, a BPD node could reside at the fringes of a wireless mesh network where communications with centrally-located MPD nodes are difficult or impossible.

To address situations where BPD nodes cannot easily pair with MPD nodes, an unpaired BPD node can be manually paired with an upstream "parent" BPD node that is already paired with an MPD node. The parent BPD node can then operate as a relay to provide the "child" BPD node with network access. One problem with this approach is that manually pairing two BPD nodes requires a field technician to perform a complicated manual pairing process to establish a communication link between the two nodes. Further, if the communication link between the two BPD nodes ever fails, then the field technician must repeat the manual pairing process. Dispatching a field technician to manually pair BPD nodes is expensive and results in excessive overhead. A preferable approach would be to implement an automated discovery process that permits two BPD nodes to automatically pair with one another. In practice, however, several technical challenges prohibit BPD nodes from reliably discovering other BPD nodes.

First, different BPD nodes oftentimes operate according to different activation schedules. Because BPD nodes only power on for very short, intermittent intervals, any two given BPD nodes are unlikely to be active during the same interval or sufficiently overlapping intervals during the discovery process. A far more likely scenario is that, when one BPD node powers on and transmits a DBR, the nearby BPD nodes are powered down and, consequently, do not receive the DBR. Nonetheless, even in the unlikely case where two BPD nodes are active at the same time and attempt to communicate, enough interference may exist within the wireless mesh network to prevent the two BPD nodes from establishing a communication link. With conventional discovery processes, BPD nodes sometimes attempt the discovery process at the same time the following day. However, many types of interference are periodic in nature, which can result in the same types of interference problems being experienced on a day-to-day basis.

Second, different BPD nodes oftentimes operate according to different channel hopping sequences and therefore typically do not operate on the same channel at the same time. Consequently, even when two BPD nodes are active at the same time, those two BPD nodes may be tuned to different channels, thereby preventing the two BPD nodes from discovering one another. In the unlikely event that two BPD nodes are actually active at the same time and tuned to the same channel, discovery may nevertheless be difficult or impossible because the particular channel may be excessively noisy. Conventionally, BPD nodes usually attempt discovery on the same channel multiple times if the first discover attempt fails, but such an approach is vulnerable to situations where that particular channel is always noisy.

Third, under normal operating conditions, numerous unpaired BPD nodes may need to pair with parent BPD nodes to gain access to the mesh network, but there is no common protocol for coordinating pairings across different BPD nodes on a large scale. Consequently, a common operating scenario is that multiple unpaired BPD nodes simultaneously attempt to pair with the same potential parent BPD node. Such a scenario can result in network contention issues that reduce overall network throughput and/or cause the potential parent BPD to become overloaded and shut down.

Because of these technical challenges, conventional discovery processes are highly inefficient and typically require excessive amounts of time before all BPD nodes in a mesh network can access the network. The overall consequence is that many BPD nodes expend a great deal of battery power during discovery, which can substantially reduce the operational lifetime of those BPD nodes.

As the foregoing illustrates, what is needed in the art are more effective discovery processes for BPD nodes in wireless mesh networks.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
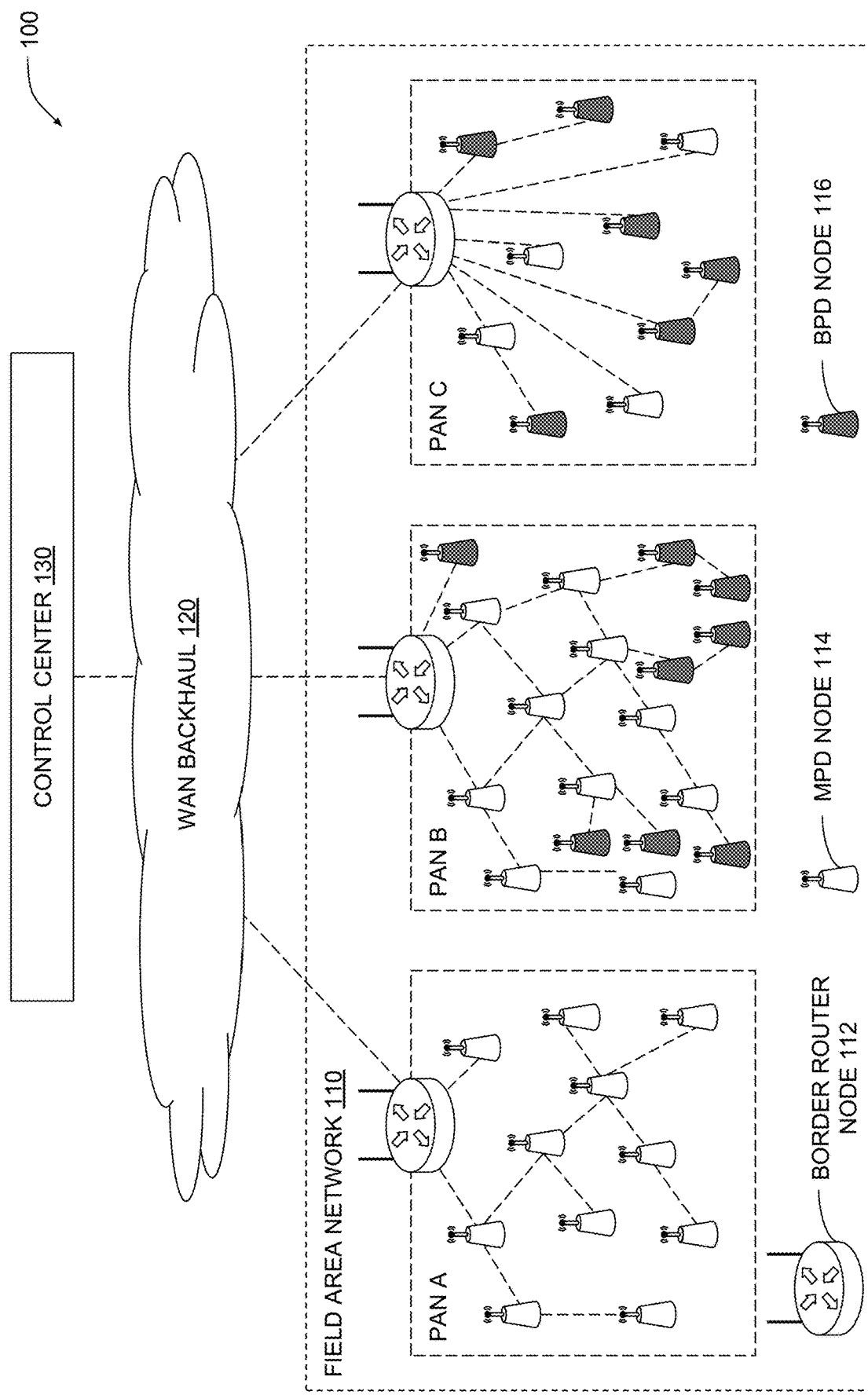
FIG. 1 illustrates a network system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

As noted above, a conventional discovery process implemented by a conventional node suffers from numerous inefficiencies. Among other things, conventional nodes operate according to widely varying activation schedules, transmit and receive data on a range of different channels, and implement no standardized protocols for pairing with one another during discovery. Collectively, these inefficiencies waste node battery power and shorten node operational lifetime.

To address these issues, various embodiments include a wireless network that includes a plurality of nodes, each of which is configured to implement an improved discovery process in order to efficiently and reliably pair with one another. To implement the discovery process, a given node implements a time slotting technique to divide time into a sequence of discovery slots. The node assigns a discovery slot number to each discovery slot and designates specific discovery slots to be discovery windows. During a discovery window, the node is active and attempts to establish communications with other nodes. Because each node implements the same time slotting technique, many nodes may be active for some duration during the same discovery window, increasing the likelihood those nodes can pair with one another.

Nodes implement several optimizations to facilitate node pairing during discovery. First, nodes designate discovery windows to occur at different times from one day to the next, thereby avoiding situations where systemic interference associated with a specific time of day impedes the discovery process. Second, during a given discovery window, each node attempts to establish communications with other nodes using a reduced set of channels that varies from one discovery window to the next. This technique increases the likelihood that nodes operate on the same channel during the discovery window while also reducing the likelihood that nodes rely on an excessively noisy channel. Third, each node implements a pairing protocol that coordinates the pairing of nodes with other nodes. The pairing protocol causes nodes to distribute pairing over time, thereby avoiding situations where many nodes attempt to pair simultaneously. The pairing protocol also helps prevent multiple nodes from simultaneously attempting to pair with the same parent node. This reduces the potential for network contention and helps avoid situations where the parent node becomes overloaded.

One advantage of the disclosed techniques is that nodes within the wireless mesh network can pair with one another in a power-efficient manner during discovery, thereby reducing power consumption and extending the operational lifetime of BPD nodes. Accordingly, the disclosed techniques represent a significant technological advancement over prior art approaches.

System Overview

FIG. 1 illustrates a network system configured to implement one or more aspects of the present embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains powered device (MPD) nodes 114. PANs B and C further include one or more battery powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. MPD nodes 114 and BPD nodes 116 are configured to gather sensor data, process the sensor data, and communicate data processing results and other information to control center 130. Border router nodes 112 operate as access points to provide MPD nodes 114 and BPD nodes 116 with access to control center 130.

Any of border router nodes 112, MPD nodes 114, and BPD nodes 116 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels, the media access control (MAC) address of the node, and other information associated with the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node. Time slots and time slot numbers are discussed in greater detail below in conjunction with FIG. 3A.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 120 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Figure 2:
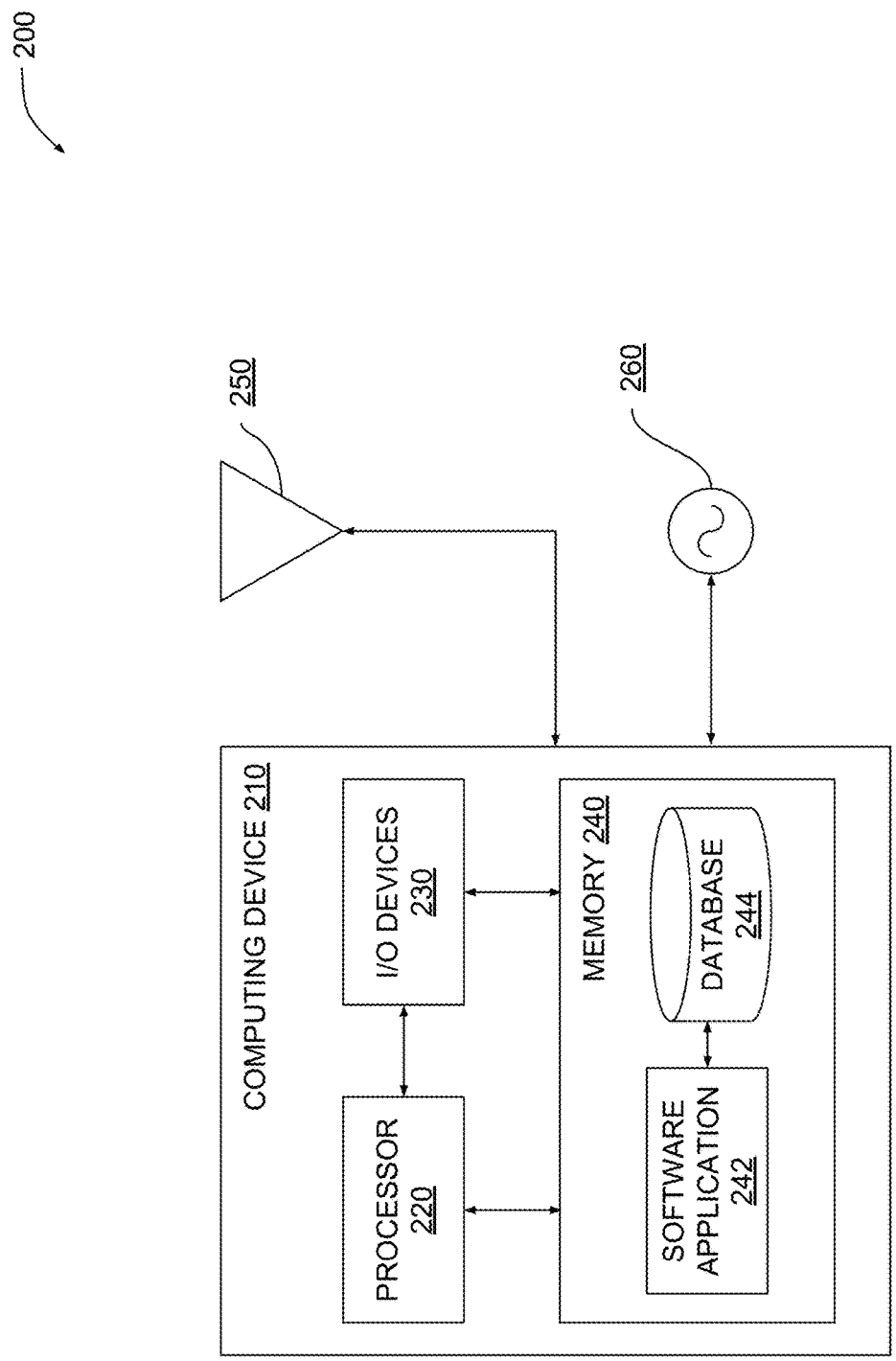
FIG. 2 illustrates a node configured to transmit and receive data within the network system of FIG. 1, according to various embodiments.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary node that may operate within the network system 100.

FIG. 2 illustrates a node configured to transmit and receive data within the mesh network of FIG. 1, according to various embodiments. As shown, a node 200 includes a computing device 210 coupled to a transceiver 250 and an oscillator 260. Computing device 210 coordinates the operations of node 200. Transceiver 250 is configured to transmit and receive data packets across network system 100 using a range of channels and power levels. Oscillator 260 provides one or more oscillation signals according to which the transmission and reception of data packets can be scheduled. Node 200 may be used to implement any of border router nodes 112, MPD nodes 114, and BPD nodes 116 of FIG. 1.

Computing device 210 includes a processor 220, input/output (I/O) devices 230, and memory 240, coupled together. Processor 220 may include any hardware configured to process data and execute software applications. Processor 220 may include a real-time clock (RTC) (not shown) according to which processor 220 maintains an estimate of the current time. The estimate of the current time may be expressed in Universal Coordinated Time (UTC), although any other standard of time measurement can also be used. I/O devices 230 include devices configured to receive input, devices configured to provide output, and devices configured to both receive input and provide output. Memory 240 may be implemented by any technically feasible storage medium.

Memory 240 includes a software application 242 and database 244, coupled together. Software application 242 includes program code that, when executed by processor 220, performs any of the node-oriented computing functionality described herein. Software application 242 may also interface with transceiver 250 to coordinate the transmission and reception of data packets across network system 100 based on timing signals generated by oscillator 260.

In operation, software application 242 implements the discovery process discussed above in conjunction with FIG. 1 in order to establish adjacency with one or more neighboring nodes. Software application 242 may generate a neighbor table that indicates node adjacency and various other neighbor data, and then store the neighbor table in database 244. Once the discovery process is complete, software application 242 causes node 200 to initiate normal operations. In the course of normal operations, node 200 implements channel hopping across a repeating sequence of time slots. Node 200 may transmit or receive data at specific time within these time slots, as discussed in greater detail below in conjunction with FIGS. 3A-3B.

Figure 3A:
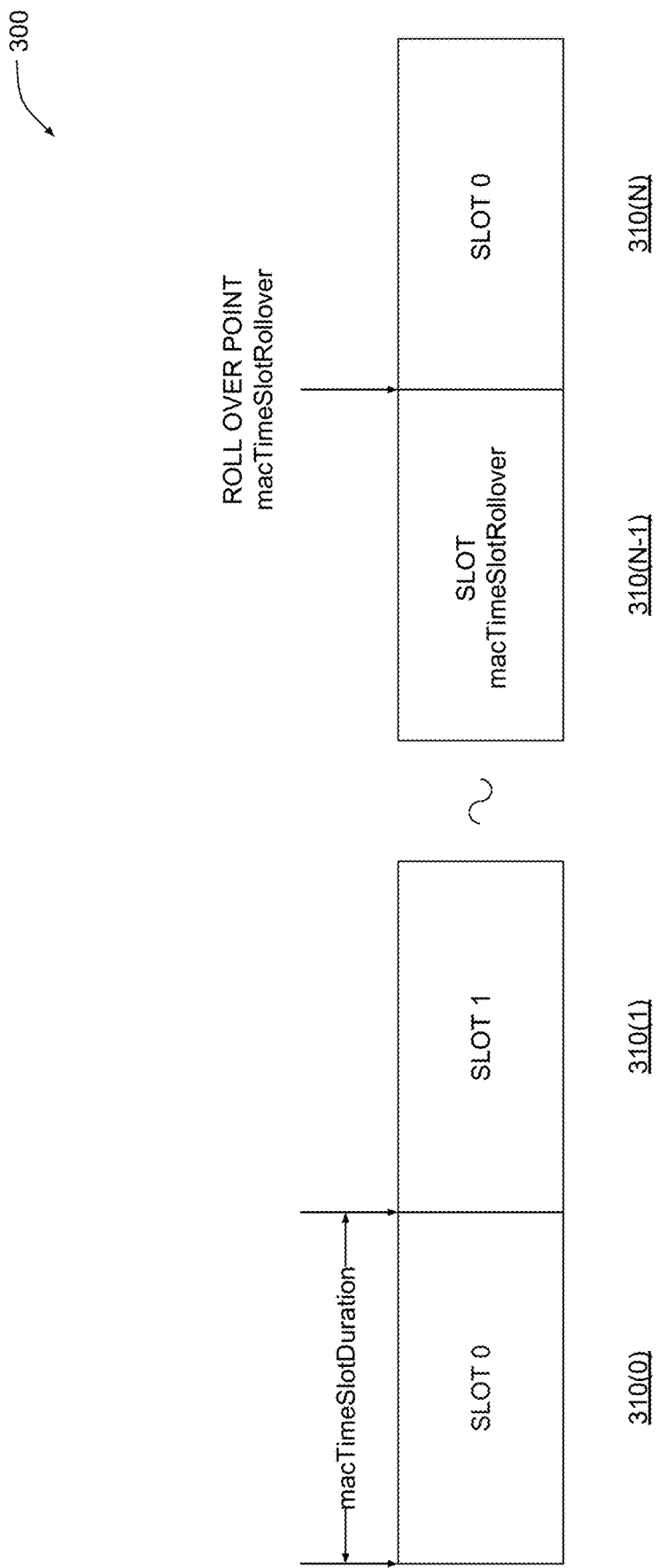
FIGS. 3A-3B illustrate sequences of time slots within which a node of FIG. 1 transmits and/or receives data, according to various embodiments.

FIG. 3A illustrates a sequence of time slots within which the node of FIG. 2 transmits and/or receives data, according to various embodiments. As shown, a sequence 300 of time slots includes N time slots 310(0) through 310(N), each having a duration of macTimeSlotDuration. A given time slot 310 is associated with a slot number falling within the range of zero to macTimeSlotRollover, where zero is the minimum slot number and macTimeSlotRollover is the maximum slot number. The current slot number increments sequentially over time until macTimeSlotRollover is reached, and then rolls over to zero.

During initialization, the node selects a random starting slot number within the range of available slot numbers and stores this slot number along with a timestamp. The node generates the timestamp based on the above-mentioned estimate of current time maintained by the RTC within processor 210. The node may also store a parts-per-million (PPM) correction factor than can be applied to the estimate of the current time.

Figure 3B:
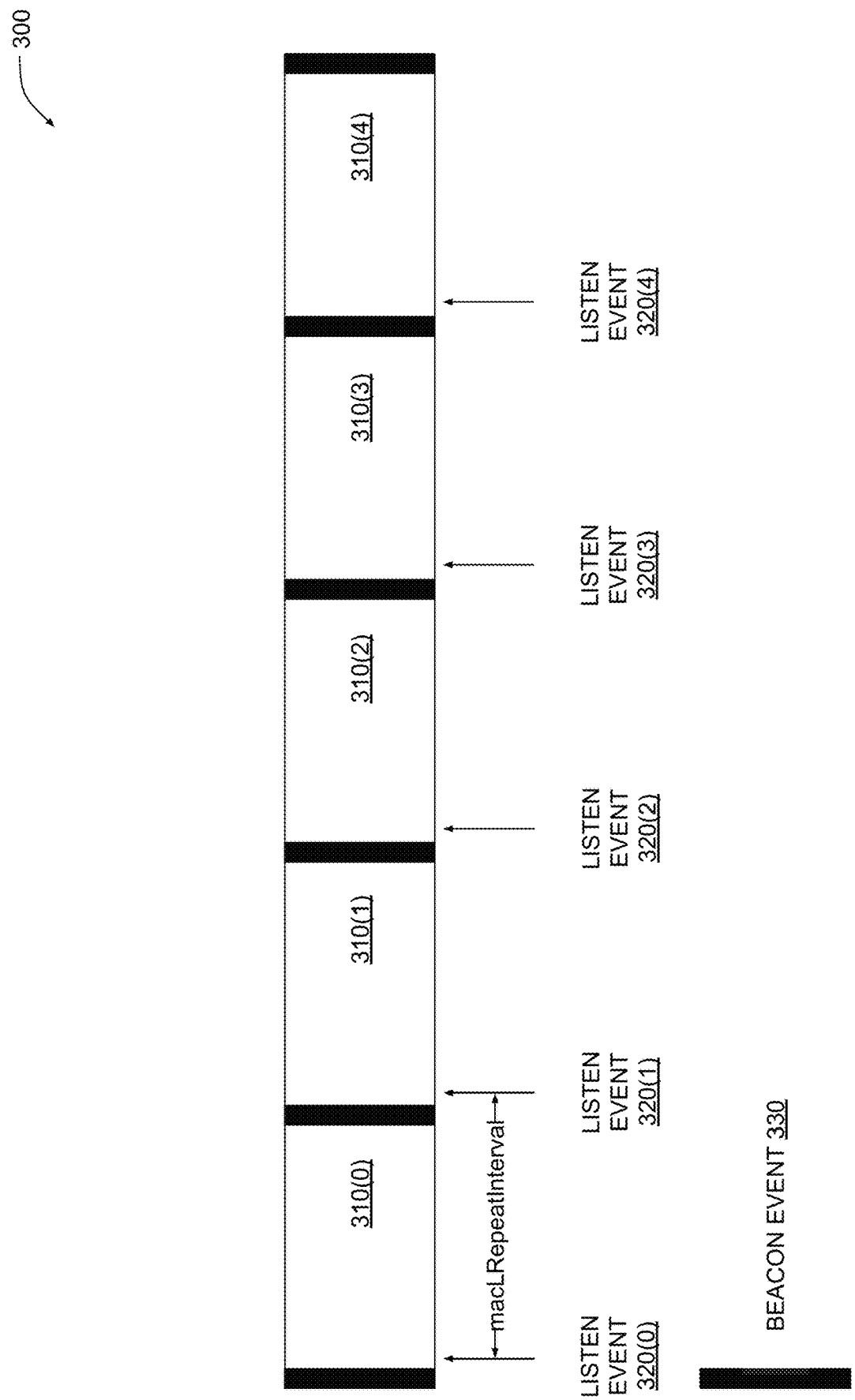

At any given time during operation, the node dynamically computes the current slot number as well as the time into the current slot using the estimate of current time and any of the other information discussed above. Based on the current slot number, the node determines a specific channel to associate with the time slot. In this manner, the node may determine a sequence of channels corresponding to a sequence of time slots. This sequence of channels is the above-referenced channel hopping sequence for the node. In embodiments where the node evaluates a Jenkins hash function to compute the current receive channel, as discussed above, the node evaluates this function using the current slot number. FIG. 3B illustrates an exemplary listening schedule associated with a node.

FIG. 3B illustrates a sequence of time slots within which the node of FIG. 2 transmits and/or receives data, according to various embodiments. As shown, sequence 300 of FIG. 3B is expanded to include time slots 310(0) through 310(4). Each time slot 310 includes a listen event 320 and a beacon event 330.

During listen events 320, the node may receive data. In particular, within a given time slot 310 and during the corresponding listen event 320, the node may receive data on the channel associated with that time slot. Listen events 320 repeat periodically with an interval of macLRepeatInterval. Listen events 320 have a configurable duration and a configurable offset within a respective time slot 310. During beacon events 330, the node transmits a beacon. For example, the node could transmit a time sync beacon that includes timing information to one or more nearby nodes. In one embodiment, the node may implement listen events 320 and beacon events 330 according to separate schedules that can be enabled or disabled independently of one another.

Referring generally to FIGS. 1-3B, the foregoing techniques permit the various types of nodes within network system 100 to communicate with one another. These nodes also implement a discovery process that is described in greater detail below in conjunction with FIGS. 4-8. Persons skilled in the art will recognize that the disclosed techniques may be applicable to any type of network and any type of node beyond those explicitly discussed herein. Further, the techniques described herein are sufficiently flexible to be utilized within any technically feasible network environment or combination of network environments and with any available communication protocols.

Power-Efficient Discovery Process

Nodes within network system 100 are configured to implement a power-efficient discovery process in order to pair with one another. This discovery process can be implemented by any of border router nodes 112, MPD nodes 114, and BPD nodes 116 residing within networks having any topology. Nonetheless, the disclosed process is especially beneficial for BPD nodes 116 which operate with limited battery power and reside within mesh network topologies. The discovery process is described below as occurring between two distinct groups of nodes: "discovering nodes" which are not yet paired with any other nodes and therefore lack network access, and "potential parent nodes" which are already paired with another node and can provide network access. Discovering nodes and potential parent nodes perform the techniques described below in conjunction with FIGS. 4-8 to implement the power-efficient discovery process.

Figure 4:
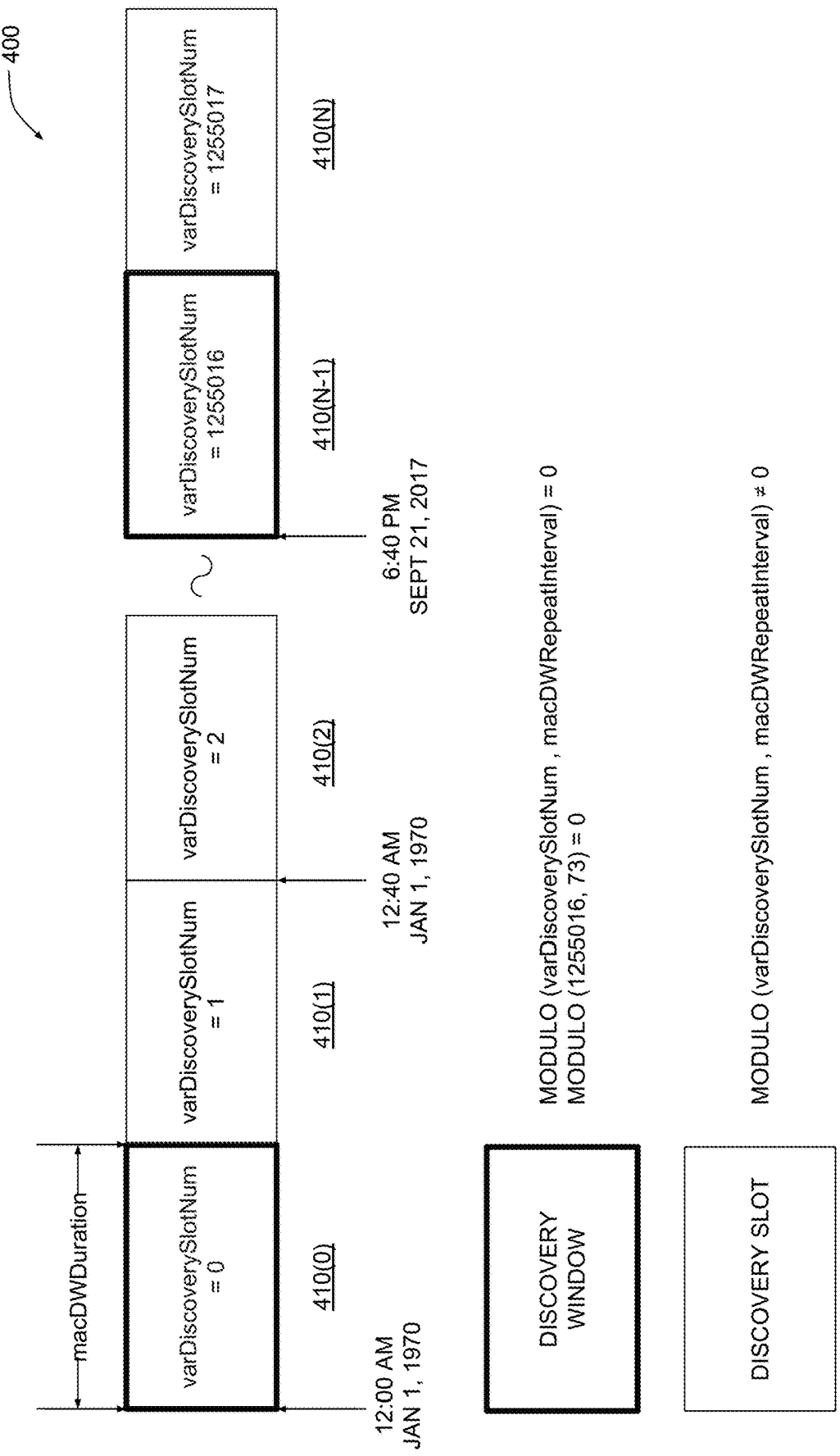
FIG. 4 illustrates a sequence of discovery slots within which a node of FIG. 1 performs a discovery process, according to various embodiments.

FIG. 4 illustrates a sequence of discovery slots within which a node of FIG. 1 may perform a discovery process, according to various embodiments. As shown, a sequence 400 of discovery slots 410 includes discovery slots 410(0), 410(1), 410(2) through 410(N−1), 410(N). Each discovery slot 410 is associated with a specific start time, measured in UTC, and is assigned a different discovery slot number varDiscoverySlotNum, as is shown. Additionally, specific discovery slots are designated to be discovery windows. Discovering nodes and potential parent nodes implement the discovery process during discovery windows, as described in greater detail below in conjunction with FIGS. 5-8. Discovery slots and discovery windows have a fixed duration of macDWDuration. Discovery windows repeat over an interval of macDWRepeatInterval.

At any time, a given node within network system 100 may evaluate the current UTC time and then determine the current discovery slot number and whether the current discovery slot is designated a discovery window. Discovery slots are designated as discovery windows when MODULO (varDiscoverySlotNum, macDWRepeatInterval)=0 evaluates to True. Because each node within network system 100 maintains an estimate of the current UTC time, multiple nodes can evaluate a current UTC time estimate and then reach the same determination of the discovery slot number and whether that discovery slot is a discovery window.

Certain combinations of macDWDuration and macDWRepeatInterval may prolong the discovery process compared to other, more favorable combinations of these parameters which can expedite discovery. For example, setting macDWDuration equal to 20 minutes and setting macDWRepeatInterval to 72 causes each node to perform the discovery process at the same time of day over multiple days. This combination of parameters may be unfavorable, however, because adverse network conditions may exist at that particular time of day which impede completion of the discovery process. A better selection of parameters might be, for example, setting macDWDuration equal to 20 minutes and setting macDWRepeatInterval to 73. This combination of parameters causes the discovery window to shift forward on sequential days, avoiding any repeated issues with particular times of day. Specific operations performed by nodes during a discovery window are described in greater detail below in conjunction with FIG. 5.

Figure 5:
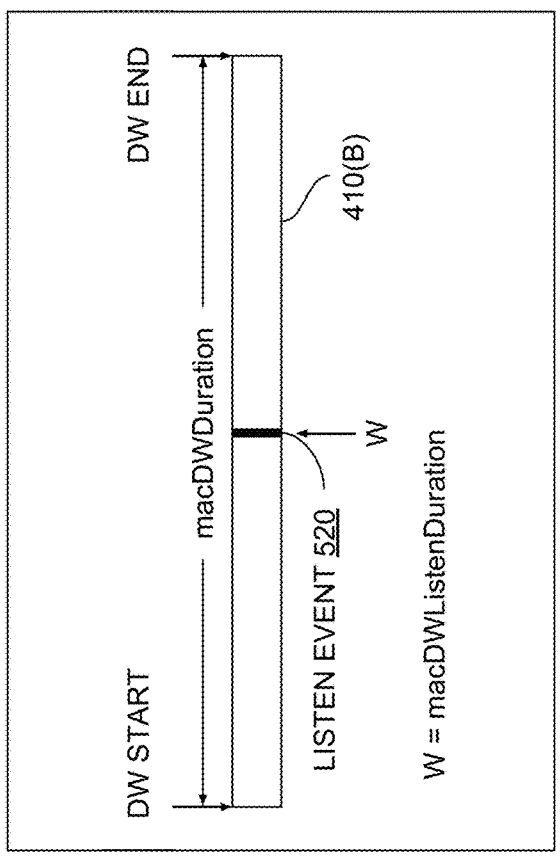
FIG. 5 illustrates how two of the nodes of FIG. 1 exchange data packets when performing a discovery process, according to various embodiments.
Figure 5:
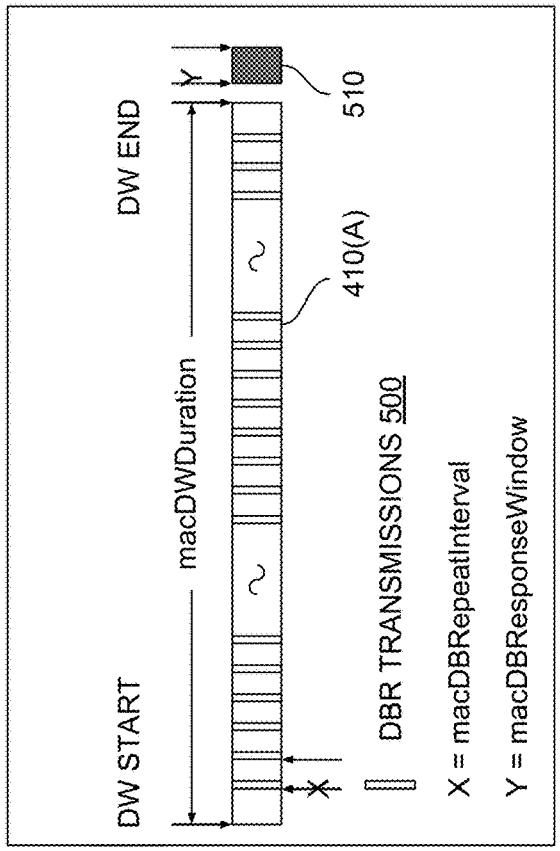

FIG. 5 illustrates how two of the nodes of FIG. 1 exchange data packets when performing the discovery process, according to various embodiments. As mentioned above, discovering nodes and potential parent nodes implement the discovery process to pair with one another. DNs implement one set of operations associated with the discovery process, while PPNs implement another set of operations associated with the discovery process, as described in greater detail herein.

As shown, a discovering node generates and broadcasts a sequence of discovery beacon requests (DBRs) 500 during a discovery window 410(A). DBRs 500 repeat over an interval of macDBRepeatInterval. Following discovery window 410(A), the discovering node implements a response window 510 during which the discovering node listens for responses to DBRs 500.

As also shown, a potential parent node executes a listen event 520 during a discovery window 410(B). Listen event 520 has a duration of macDWListenDuration and is scheduled to occur at or near the center of discovery window

410(B). The potential parent node may receive DBRs 500 during listen event 520. If the potential parent node receives a DBR 500 during listen event 520, then the potential parent node responds by transmitting a discovery beacon (DB) to the discovering node during response window 510. In one embodiment, each DBR 520 indicates the number of remaining DBRs 500 to be transmitted, allowing the potential parent node to determine when response window 510 occurs. A given DB includes the MAC address of the potential parent node as well as timing information which facilitates further communications between the two nodes. The timing information may include a PPM uncertainty of the RTC associated with the potential parent node, among other things.

Discovery window 410(B) is generally time-aligned to discovery window 410(A), although due to RTC drift associated with the discovering node and the potential parent node, these windows may be slightly offset relative to one another. To compensate, macDWDuration for both nodes can be scaled to maximize time overlap between any two discovery windows.

In addition, macDWListenDuration is generally configured to have a longer duration than macDBRepeatInterval to allow the potential parent node to receive multiple DBRs 500 during listen event 520. macDWListenDuration may also be scaled in proportion to macDBRepeatInterval so that the potential parent node may receive at least a minimum number of DBRs 500 during listen event 520. In one embodiment, the potential parent node may receive N+1 DBRs 500 during a listen event 520 having a duration equal to N×macDBRepeatInterval, N being an integer value. In practice, macDWListenDuration may be scaled to allow the potential parent node to receive approximately seven DBRs 500 during listen event 520.

As mentioned, nodes within network system 100 periodically change receive and transmit frequencies according to a channel hopping sequence that may vary between different nodes. Any given hopping sequence may span up to M different channels, M being an integer value associated with the specific network within which the node resides and defining the number of available channels associated with that network. During normal operation, nodes within network system 100 typically operate using 64 channels. In one embodiment, each node stores a channel mask that defines the available channels and indications of which channels are currently active.

With a normal operating configuration, the probability that any two nodes operate on the same channel at the same point in time is extremely low. For example, suppose a first node implements a first channel hopping sequence across 64 different channels, while the second node implements a second channel hopping sequence across those 64 different channels. The probability that both the first node and the second node operate on the same channel at any given point in time would be $\frac{1}{64}$. In addition, suppose that each node operates during just one 4 millisecond (ms) interval within a given one-minute minute period. Because there are 15,000 4 ms intervals within a one-minute period, the probability that both the first node and the second node operate during the same 4 ms interval of any given one-minute period is $\frac{1}{15,000}$. Combining these probabilities shows that the probability of both the first node and the second node operating on the same channel during the same interval of a given one-minute period is $(\frac{1}{64})*(\frac{1}{15,000})$, or $\frac{1}{960,000}$. Given such low odds, the first node and the second node most likely would have to attempt to discover one another over an extraordinarily long period of time before being able to establish a communication link. As a general matter, performing discovery operations over long periods of time can waste an excessive amount of already scarce battery power.

To address the above problem, the nodes within network system 100 implement a special operating configuration during the discovery process that substantially increases the likelihood that any two nodes can discover one another quickly and/or power efficiently. In particular, during any given discovery window, nodes operate using only a subset of the available channels in order to increase the likelihood that any two nodes operate on the same channel at the same time. In operation, nodes perform the discovery process using just three channels. In one embodiment, nodes operate according to a "hybrid mode" during discovery where specific power settings are used when transmitting over the subset of channels. One example of a hybrid mode is Federal Communications Commission (FCC) Code of Federal Regulations (CFR) 47 part 15.247(f).

To select the subset of channels for a particular discovery window, a given node evaluates the discovery slot number assigned to a given discovery slot. In one embodiment, a node may implement a Jenkins hash function based on the discovery slot number to compute the subset of channels. Because each node determines the discovery slot number based on an estimate of UTC time, some or all nodes within network system 100 typically determine the same subset of channels for a given discovery window. The specific channels within the subset may change from one discovery window to the next when the discovery slot numbers associated with those discovery windows vary over time.

Via the technique described above, the discovering node and the potential parent node evaluate the current discovery slot number and then compute a subset of channels to be used during discovery windows 410(A) and 410(B). The discovering node then selects a first channel to be used when transmitting a first DBR 500. In one embodiment, the discovering node selects the first channel based on the slot number corresponding to a current slot associated with normal operation (a time slot 310). For each subsequent DBR 500, the discovering node iterates sequentially through the subset. In one embodiment, the discovering node iterates through the subset based on a skip factor that is derived from a ratio of the number of channels used for discovery and the total number of available channels.

The potential parent node randomly selects a channel from the subset of channels and then listens for DBRs 500 on that channel. The potential parent node may then receive multiple DBRs 500 that span some or all channels in the subset of channels, ideally including the selected channel on which the potential parent node listens. With one configuration, macDWListenDuration is scaled to allow the potential parent to receive seven DBRs 500 during listen event 520. Further, those DBRs 500 are transmitted across each of three possible channels. In this configuration, the likelihood that the potential parent node receives a DBR 500 is exceedingly high. In addition, because the discovering node and the potential parent node select different subsets of channels across different discovery windows 410, this approach is robust against systemic interference which may disrupt communications on a specific channel.

One additional advantage of the above-described approach is that the potential parent node performs passive listening to receive any DBRs 500 that may be sent, thereby avoiding the creation of unwanted radio frequency noise. Accordingly, when there are no discovering nodes attempting discovery, the disclosed techniques do not increase the global level of interference. This approach differs from conventional discovery processes that involve potential parent nodes actively transmitting beacons, which increases the global level of interference.

Upon receiving one or more DBRs 500 during listen event 520, the potential parent node transmits a DB to the discovering node during response window 520 in the manner discussed. In response to receiving the DB, the discovering node updates a neighbor table to include information associated with the potential parent node. This information allows the two nodes to establish temporary communications prior to pairing.

Although the above steps are described as occurring between one discovering node and one potential parent node, in practice, multiple discovering nodes and multiple potential parent nodes oftentimes implement these steps with one another. For example, many discovering nodes may transmit DBRs which are received by one potential parent node, and that one potential parent node may transmit DBs to each of those discovering nodes. Similarly, one discovering node may transmit DBRs which are received by multiple potential parent nodes, and each of those potential parent nodes may transmit a DB that is received by the one discovering node. To coordinate node pairing under such circumstances, discovering nodes and potential parent nodes implement a pairing protocol that is described in greater detail below in conjunction with FIG. 6.

Figure 6:
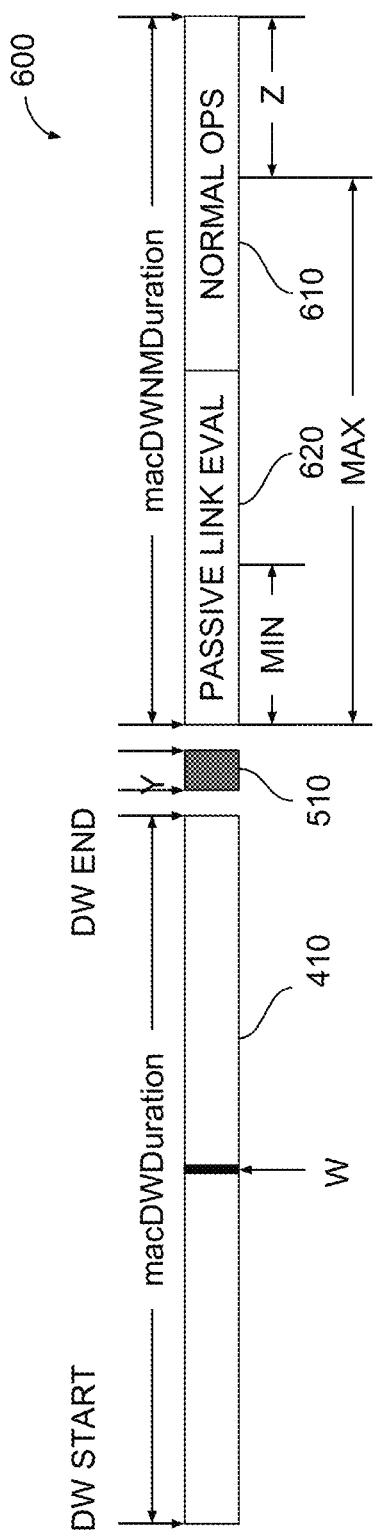
FIG. 6 illustrates how a node of FIG. 1 selects a parent node with which to pair during a discovery process, according to various embodiments.

FIG. 6 illustrates how a node of FIG. 1 selects a parent node with which to pair during the discovery process, according to various embodiments. As shown, pairing protocol 600 includes passive link evaluation (eval) 610 followed by normal operations (ops) 620. Passive link evaluation 610 may occur for a minimum duration (min) but not exceed a maximum duration (max). In one embodiment, a discovering node implements a timer to control the duration of passive link evaluation 610.

When a potential parent node transmits a DB to a discovering node in the manner described above, the potential parent node includes in the DB timing information indicating times when the potential parent node transmits time sync beacons. The time sync beacons could be transmitted, for example, during beacon events 330 discussed above in conjunction with FIG. 3B. The time sync beacons may indicate a current time estimate maintained by the potential parent node and/or a PPM uncertainty value associated with that time estimate.

During passive link evaluation 610, the discovering node may receive time sync beacons from many potential parent nodes. The discovering node analyzes received time sync beacons and computes a metric for each potential parent node. The discovering node may update the neighbor table to include the metric for each potential parent node. The metric computed for a given potential parent node could be generated, for example, based on the average RSSI of beacons received from the potential parent node, the rank of the potential parent node, a hop count between the potential parent node and an MPD node 114, any combination these factors, and so forth. The discovering node then randomly selects a time during passive link evaluation 610 to select a potential parent node for pairing. At the selected time, the discovering node analyzes the neighbor table and then selects the potential parent node having the greatest metric. The discovering node then pairs with the selected node. In one embodiment, the pairing process involves a negotiation of communication schedules and/or an exchange of timing information.

Once paired to a discovering node, the potential parent node (henceforth referred to as the parent node) enters normal operations 620 and includes within any subsequent time sync beacons an indication that pairing has already occurred and the parent node cannot pair with additional discovering nodes. Subsequently, when other discovering nodes receive time sync beacons from the parent node, those other discovering nodes may remove the parent node from the neighbor table (since that parent node cannot be paired with). In one embodiment, potential parent nodes pair with multiple discovering nodes before indicating that additional pairing cannot occur.

The pairing protocol described above provides several benefits. First, discovering nodes randomly select pairing times which reduces the likelihood that multiple discovering nodes attempt pairing simultaneously. Accordingly, network contention can be reduced or eliminated. Second, potential parent nodes indicate to discovering nodes when pairing has already occurred, avoiding situations where multiple discovering nodes pair to the same potential parent node and overload that node.

Referring generally to FIGS. 4-6, the above-described discovery process addresses several specific technical issues which complicate discovery with conventional network systems. First, implementing aperiodic discovery windows, as discussed above in conjunction with FIG. 4, mitigates situations where systemic interference associated with a specific time of day impedes discovery. Second, implementing a reduced subset of channels which varies between discovery windows, as discussed above in conjunction with FIG. 4, increases the likelihood that any two nodes establish communications during discovery. Third, implementing the pairing protocol discussed above in conjunction with FIG. 6 helps to prevent network contention and node overload.

These various techniques collectively improve the discovery process by allowing nodes to discover one another far more power efficiently and/or quickly than can typically be accomplished in previous approaches. Thus, these techniques can substantially reduce the amount of precious battery power nodes have to expend during the discovery process. Accordingly, the disclosed techniques address several technical challenges associated with conventional systems and approaches.

Procedures Implemented During the Discovery Process

Figure 7:
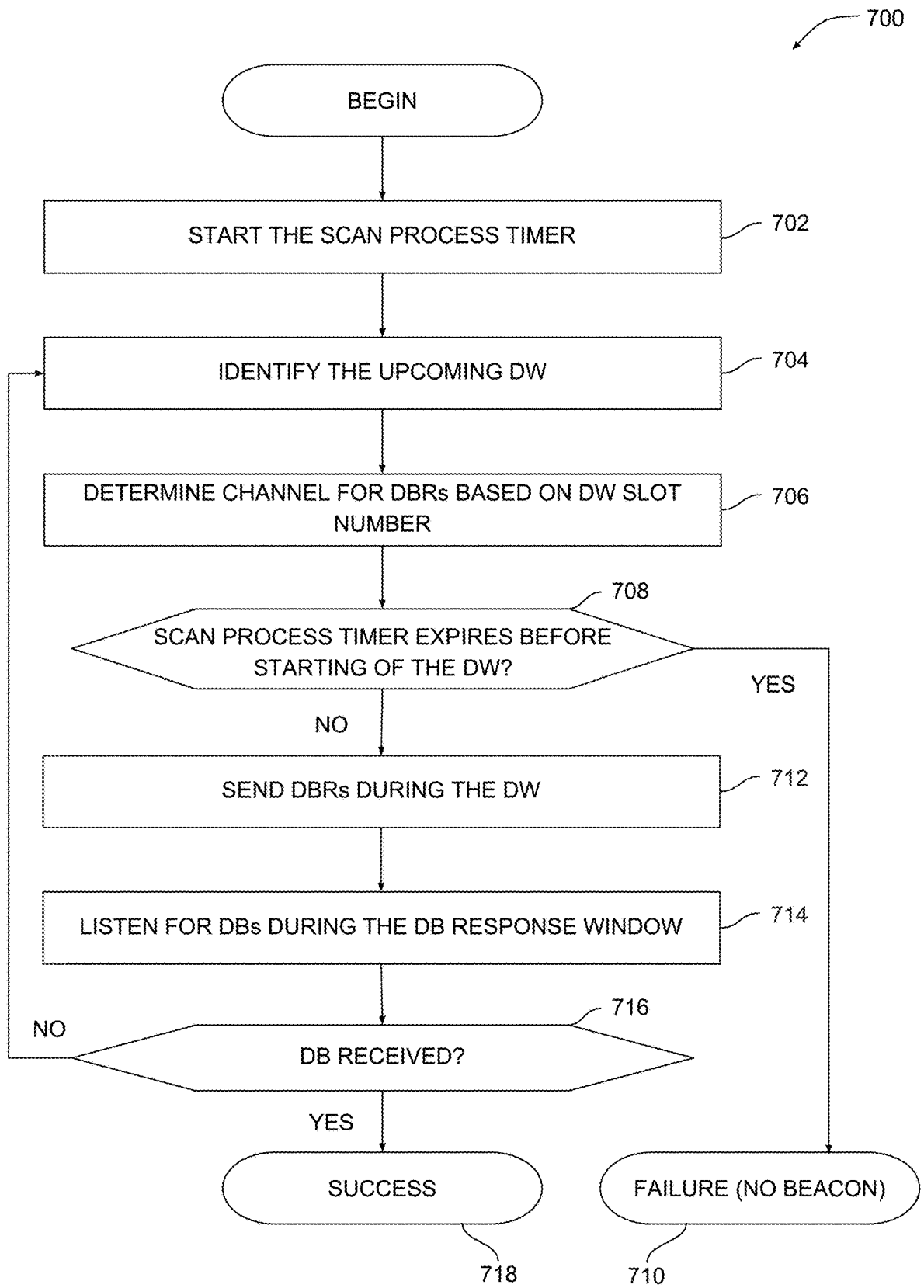
FIG. 7 is a flow diagram of method steps for discovering a potential parent node, according to various embodiments.

FIG. 7 is a flow diagram of method steps a node implements when discovering an adjacent node, according to various embodiments. Although the method steps are described in conjunction with the systems of FIGS. 1-6, persons skilled in the art will understand that any system may be configured to perform the method steps in any order.

As shown, a method 700 begins at step 702 where a discovering node starts a scan process timer. The scan process timer limits the amount of time allowed to elapse before the subsequent discovery window begins. In one embodiment, the scan process timer is set based on macDWRepeatInterval. At step 704, the discovering node identifies the upcoming discovery window. The discovering node may evaluate the current or any subsequent discovery slot number to determine whether any of those discovery slots is designated as a discovery window.

At step 706, the discovering node determines a channel for transmitting DBRs based on the slot number of the upcoming discovery window. In doing so, the discovering node may compute a subset of the available channels and then select one channel from that subset, as described above in conjunction with FIG. 5. At step 708, the discovering node determines whether the scan process timer has expired and terminates the method 700 at step 710 if the timer has expired. Otherwise, the method 700 proceeds to step 712.

At step 712, the discovering node transmits DBRs during the discovery window. The discovering node may iterate sequentially through the subset of available channels used for discovery when transmitting sequential DBRs or implement any other technique for selecting a channel. At step 714, the discovering node listens for DBs during the response window following the discovery window. Any potential parent nodes which receive one or more DBRs sent at step 712 may respond by transmitting a DB during the response window. At step 716, the discovering node determines whether any DBs are received during the response window.

Figure 8:
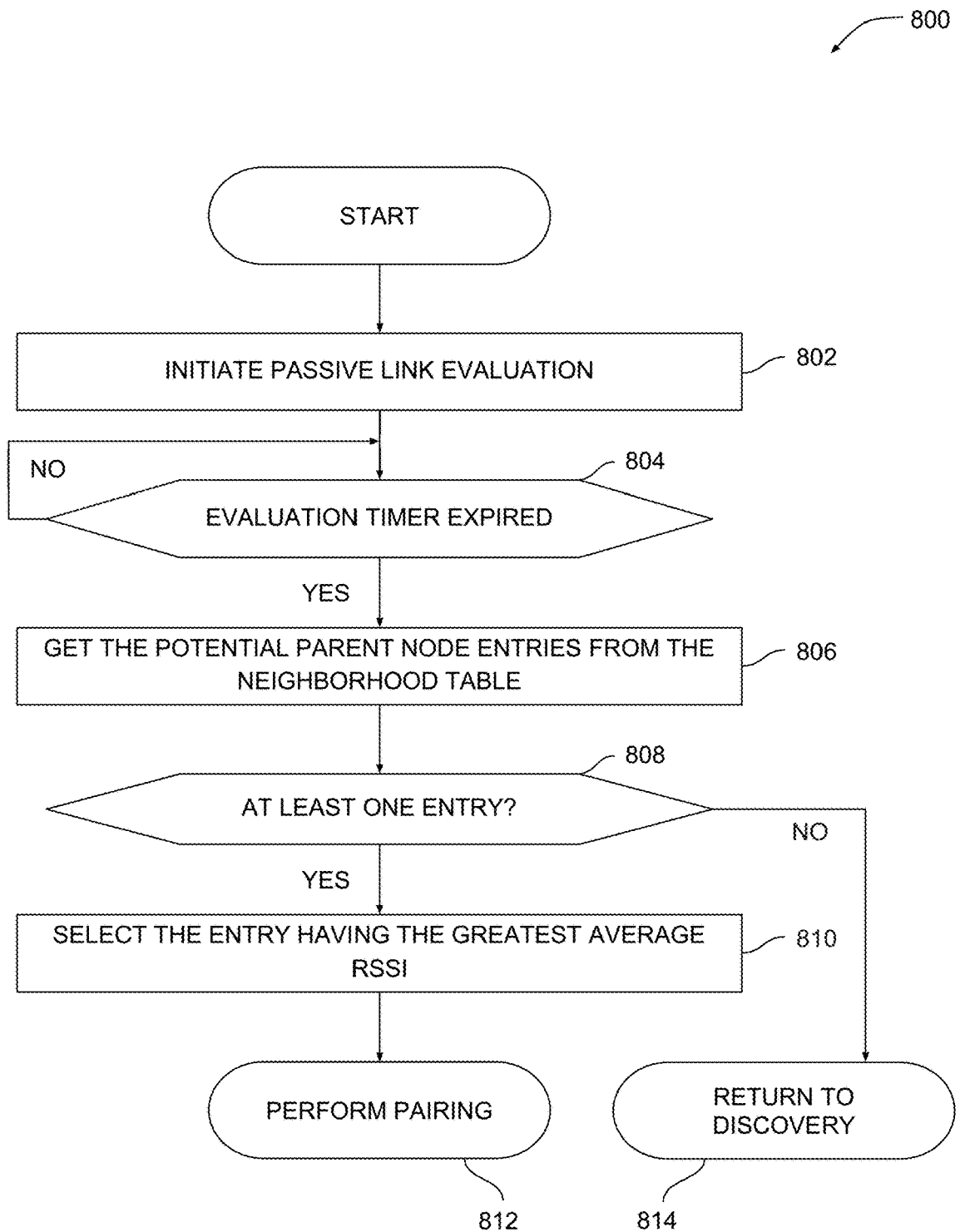
FIG. 8 is a flow diagram of method steps for selecting a potential parent node with which to pair, according to various embodiments.

If the discovering node does not receive any DBs, then the method 700 returns to step 704 and proceeds in the manner described above. However, if the discovering node does receive a DB during the response window, then the method 700 proceeds to step 718 and the discovering node successfully establishes communications with a potential parent node. The discovering node may analyze the DB to extract timing information associated with the potential parent node and then update a neighbor table to reflect this information. FIG. 8 sets forth a pairing protocol that may be subsequently implemented by the discovering node.

FIG. 8 is a flow diagram of method steps a node implements when selecting an adjacent node with which to pair, according to various embodiments. Although the method steps are described in conjunction with the systems of FIGS. 1-6, persons skilled in the art will understand that any system may be configured to perform the method steps in any order.

As shown, a method 800 begins at step 802, where a discovering node initiates passive link evaluation. In doing so, the discovering node starts a passive link evaluation timer and begins receiving time sync beacons from one or more potential parent nodes. The passive link evaluation timer allows the discovering node to perform passive link evaluation for at least a minimum amount of time needed to evaluate various links. During evaluation, the discovering node may compute the average RSSI of time sync beacons received across the link, among other ways to evaluate a communication link. At step 804, the discovering node waits until the timer expires. During this time, the discovering node may receive many time sync beacons from many different potential parent nodes and populate a neighbor table based on the received beacons. At step 806, after the timer expires, the discovering node collects any entries from the neighbor table associated with potential parent nodes.

At step 808, the discovering node determines whether at least one entry is found in the neighbor table. If no entries are found, meaning that the discovering node did not receive any time sync beacons during passive link evaluation, then the method proceeds to step 814 and the discovery process repeats. Otherwise, the method 800 proceeds to step 810, where the discovering node selects the potential parent node having the greatest RSSI. In some embodiments, the discovering node selects a potential parent node based on other metrics as well. The method then proceeds to step 812, where the discovering node pairs with the potential parent node. In response, the parent node may then transmit subsequent time sync beacons to over discovering nodes indicating that pairing may no longer occur.

In sum, a wireless network includes a plurality of nodes, each of which is configured to implement an improved discovery process to efficiently and reliably pair with one another. To implement the discovery process, a node implements a time slotting technique to divide time into a sequence of discovery slots. The node assigns a discovery slot number to each discovery slot and designates specific discovery slots to be discovery windows. During a given discovery window, the node is active and attempts to establish communications with other nodes. Because each node implements the same time slotting technique, many nodes may be active for some duration during the same discovery window, increasing the likelihood those nodes can pair with one another.

When performing the discovery process, nodes implement several optimizations to facilitate node pairing. First, each node designates discovery windows to occur at different times from one day to the next, thereby avoiding situations where systemic interference associated with a specific time of day impedes the discovery process. Second, during a given discovery window, each node attempts to establish communications with other nodes using a reduced set of channels that varies from one discovery window to the next. This technique increases the likelihood that nodes operate on the same channel during the discovery window while also reducing the likelihood that both nodes rely on an excessively noisy channel. Third, each node implements a pairing protocol that coordinates the pairing of nodes with other nodes. The pairing protocol causes nodes to distribute pairing over time, thereby avoiding situations where all nodes attempt to pair simultaneously. The pairing protocol helps prevent multiple nodes from simultaneously attempting to pair with the same parent node, thereby reducing the potential for network contention and minimizing situations where the parent node becomes overloaded.

One advantage of the disclosed techniques is that nodes within the wireless mesh network can efficiently pair with one another during discovery, thereby reducing power consumption and extending the operational lifetime of BPD nodes. In particular, nodes implement aperiodic discovery windows in coordination with one another, thereby avoiding systemic interference potentially associated with specific times of day. Nodes also implement a reduced set of channels for performing discovery, which increases the likelihood that any two nodes operate on the same channel during a given discovery window. Finally, nodes implement a pairing protocol in order to coordinate pairing between discovering nodes and potential parent nodes. This approach reduces network contention and helps avoid node overload. Accordingly, the disclosed techniques represent a significant technological advancement over prior art approaches.

1. Some embodiments include a computer-implemented method for discovering potential parent nodes within a wireless mesh network, the method comprising determining a first time slot number based on a first estimate of current time, determining that a discovery process should be executed during a first time slot based on the first time slot number, determining a first set of channels to use when performing the discovery process based on a plurality of available channels and the first time slot number, and transmitting one or more packets to a potential parent node during the first time slot and across the first set of channels to establish a communication link with the potential parent node.

2. The computer-implemented method of clause 1, wherein the first estimate of current time comprises a first Universal Coordinated Time (UTC) time value.

3. The computer-implemented method of any of clauses 1 and 2, further comprising identifying a sequence of time slots based on a sequence of estimates of current time, wherein the sequence of time slots includes the first time slot and the sequence of estimates of current time includes the first estimate of current time.

4. The computer-implemented method of any of clauses 1, 2, and 3, wherein the discovery process is only executed during every Nth time slot included in the sequence of time slots, N being an integer value.

5. The computer-implemented method of any of clauses 1, 2, 3, and 4, wherein the one or more packets are transmitted to the potential parent node using a first power setting that is associated with a hybrid mode of operation.

6. The computer implemented method of any of clauses 1, 2, 3, 4, and 5, wherein the one or more packets are transmitted to the potential parent node during the first time slot across each channel included in the first set of channels, and further comprising receiving a first packet from the potential parent node, wherein the potential parent node transmits the first packet in response to at least one packet included in the one or more packets, and identifying the potential parent node based on the first packet.

7. The computer-implemented method of any of clauses 1, 2, 3, 4, 5, and 6, wherein the potential parent node transmits the first packet during a response window that begins subsequent to when the first time slot ends.

8. The computer-implemented method of any of clauses 1, 2, 3, 4, 5, 6, and 7, wherein the first set of channels includes fewer channels than the plurality of available channels.

9. The computer-implemented method of any of clauses 1, 2, 3, 4, 5, 6, 7, and 8, wherein the potential parent node determines a second time slot number based on an independent estimate of current time, determines that the discovery process should be executed during a second time slot based on the second time slot number, and independently determines the first set of channels based on the plurality of available channels and the second time slot number.

10. The computer-implemented method of any of clauses 1, 2, 3, 4, 5, 6, 7, 8, and 9, wherein the first time slot number and the second time slot number have the same value, and the first time slot and the second time slot at least partially overlap with one another.

11. Some embodiments include a non-transitory computer-readable medium storing program instructions that, when executed by a processor, cause the processor to discover potential parent nodes within a wireless mesh network by performing the steps of determining a first time slot number based on a first estimate of current time, determining that a discovery process should be executed during a first time slot based on the first time slot number, determining a first set of channels to use when performing the discovery process based on a plurality of available channels and the first time slot number, and transmitting one or more packets to a potential parent node during the first time slot and across the first set of channels to establish a communication link with the potential parent node.

12. The non-transitory computer-readable medium of clause 11, further comprising identifying a sequence of time slots based on a sequence of estimates of current time, wherein the sequence of time slots includes the first time slot, the sequence of estimates of current time includes the first estimate of current time, and the discovery process is only executed during a subset of time slots included in the sequence of time slots.

13. The non-transitory computer-readable medium of any of clauses 11 and 12, wherein the one or more packets are transmitted to the potential parent node during only a first interval within the first time slot.

14. The non-transitory computer-readable medium of any of clauses 11, 12, and 13, wherein the one or more packets are transmitted to the potential parent node using a first power setting that is associated with a hybrid mode of operation.

15. The non-transitory computer-readable medium of any of clauses 11, 12, 13, and 14, wherein the one or more packets are transmitted to the potential parent node during the first time slot across each channel included in the first set of channels, and further comprising receiving a first packet from the potential parent node, wherein the potential parent node transmits the first packet in response to at least one packet included in the one or more packets, and identifying the potential parent node based on the first packet, wherein the potential parent node transmits the first packet using a first channel included in the plurality of available channels.

16. Some embodiments include a system, comprising a potential parent node that resides within a wireless mesh network, and a discovering node that resides within the wireless mesh network and performs the steps of determining a first time slot number based on a first estimate of current time, determining that a discovery process should be executed during a first time slot based on the first time slot number, determining a first set of channels to use when performing the discovery process based on a plurality of available channels and the first time slot number, and transmitting one or more packets to the potential parent node during the first time slot and across the first set of channels to establish a communication link with the potential parent node.

17. The system of clause 16, wherein the discovering node transmits the one or more packets during the first time slot across each channel included in the first set of channels, and further comprising receiving a first packet from the potential parent node, and identifying the potential parent node based on the first packet.

18. The system of any of clauses 16 and 17, wherein the potential parent node performs the additional step of transmitting the first packet to the discovering node in response to at least one packet included in the one or more packets.

19. The system of any of clauses 16, 17, and 18, wherein the first packet is transmitted using a first channel included in the plurality of available channels and during a response window that begins subsequent to when the first time slot ends.

20. The system of any of clauses 16, 17, 18, and 19, wherein the discovering node includes a memory storing a software application, and a processor that, upon executing the software application, is configured to perform the steps of determining the first time slot number, determining that the discovery process should be executed, determining the reduced set of channels, and transmitting the one or more packets to the potential parent node.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for discovering potential parent nodes within a wireless mesh network, the method comprising:
   determining a first time slot number included in a plurality of time slot numbers based on a first estimate of current time, wherein each time slot number included in the plurality of time slot numbers corresponds to a different time slot included a plurality of time slots;
   determining that a discovery process should be executed during a first time slot based on the first time slot number and that the discovery process should not be executed during a second time slot included in the plurality of time slots based on a second time slot number corresponding to the second time slot;
   determining a first set of channels to use when performing the discovery process based on a plurality of available channels and the first time slot number; and
   transmitting one or more packets to a potential parent node during the first time slot and across the first set of channels to establish a communication link with the potential parent node.

2. The computer-implemented method of claim 1, wherein the first estimate of current time comprises a first Universal Coordinated Time (UTC) time value.

3. The computer-implemented method of claim 2, further comprising identifying a sequence of time slots based on a sequence of estimates of current time, wherein the sequence of time slots includes the first time slot and the sequence of estimates of current time includes the first estimate of current time.

4. The computer-implemented method of claim 3, wherein the discovery process is only executed during every Nth time slot included in the sequence of time slots, N being an integer value.

5. The computer-implemented method of claim 1, wherein the one or more packets are transmitted to the potential parent node using a first power setting that is associated with a hybrid mode of operation.

6. The computer implemented method of claim 1, wherein the one or more packets are transmitted to the potential parent node during the first time slot across each channel included in the first set of channels, and further comprising:
   receiving a first packet from the potential parent node, wherein the potential parent node transmits the first packet in response to at least one packet included in the one or more packets; and
   identifying the potential parent node based on the first packet.

7. The computer-implemented method of claim 6, wherein the potential parent node transmits the first packet during a response window that begins subsequent to when the first time slot ends.

8. The computer-implemented method of claim 1, wherein the first set of channels includes fewer channels than the plurality of available channels.

9. The computer-implemented method of claim 1, wherein the potential parent node:

determines a third time slot number based on an independent estimate of current time;

determines that the discovery process should be executed during a third time slot based on the third time slot number; and independently determines the first set of channels based on the plurality of available channels and the third time slot number.

10. The computer-implemented method of claim 9 wherein the first time slot number and the third time slot number have the same value, and the first time slot and the third time slot at least partially overlap with one another.

11. One or more non-transitory computer-readable media storing program instructions that, when executed by one or more processors, cause the one or more processors to discover potential parent nodes within a wireless mesh network by performing the steps of:

determining a first time slot number included in a plurality of time slot numbers based on a first estimate of current time, wherein each time slot number included in the plurality of time slot numbers corresponds to a different time slot included a plurality of time slots;

determining that a discovery process should be executed during a first time slot based on the first time slot number and that the discovery process should not be executed during a second time slot included in the plurality of time slots based on a second time slot number corresponding to the second time slot;

determining a first set of channels to use when performing the discovery process based on a plurality of available channels and the first time slot number; and transmitting one or more packets to a potential parent node during the first time slot and across the first set of channels to establish a communication link with the potential parent node.

12. The one or more non-transitory computer-readable media of claim 11, further comprising identifying a sequence of time slots based on a sequence of estimates of current time, wherein the sequence of time slots includes the first time slot, the sequence of estimates of current time includes the first estimate of current time, and the discovery process is only executed during a subset of time slots included in the sequence of time slots.

13. The one or more non-transitory computer-readable media of claim 11, wherein the one or more packets are transmitted to the potential parent node during only a first interval within the first time slot.

14. The one or more non-transitory computer-readable media of claim 11, wherein the one or more packets are transmitted to the potential parent node using a first power setting that is associated with a hybrid mode of operation.

15. The one or more non-transitory computer-readable media of claim 11, wherein the one or more packets are transmitted to the potential parent node during the first time slot across each channel included in the first set of channels, and further comprising:

receiving a first packet from the potential parent node, wherein the potential parent node transmits the first packet in response to at least one packet included in the one or more packets; and identifying the potential parent node based on the first packet, wherein the potential parent node transmits the first packet using a first channel included in the plurality of available channels.

16. A system, comprising:

a potential parent node that resides within a wireless mesh network; and a discovering node that resides within the wireless mesh network and performs the steps of:

determining a first time slot number included in a plurality of time slot numbers based on a first estimate of current time, wherein each time slot number included in the plurality of time slot numbers corresponds to a different time slot included a plurality of time slots, determining that a discovery process should be executed during a first time slot based on the first time slot number and that the discovery process should not be executed during a second time slot included in the plurality of time slots based on a second time slot number corresponding to the second time slot, determining a first set of channels to use when performing the discovery process based on a plurality of available channels and the first time slot number, and transmitting one or more packets to the potential parent node during the first time slot and across the first set of channels to establish a communication link with the potential parent node.

17. The system of claim 16, wherein the discovering node transmits the one or more packets during the first time slot across each channel included in the first set of channels, and further comprising:

receiving a first packet from the potential parent node; and identifying the potential parent node based on the first packet.

18. The system of claim 17, wherein the potential parent node performs the additional step of transmitting the first packet to the discovering node in response to at least one packet included in the one or more packets.

19. The system of claim 18, wherein the first packet is transmitted using a first channel included in the plurality of available channels and during a response window that begins subsequent to when the first time slot ends.

20. The system of claim 16, wherein the discovering node includes:

a memory storing a software application; and a processor that, upon executing the software application, is configured to perform the steps of:

determining the first time slot number, determining that the discovery process should be executed, determining the first set of channels, and transmitting the one or more packets to the potential parent node.

21. The one or more non-transitory computer-readable media of claim 11, further comprising:

determining a third time slot number based on a second estimate of current time, wherein the second estimate of current time is different from the estimate of current time;

determining that a second discovery process should be executed during a third time slot based on the third time slot number;

determining a second set of channels to use when performing the second discovery process based on the plurality of available channels and the third time slot number, wherein the second set of channels is different from the first set of channels; and transmitting one or more packets to at least one potential parent node during the third time slot and across the second set of channels to establish a communication link with the at least one potential parent node.

\* \* \* \* \*